A. VEAL.
HALTER.
APPLICATION FILED APR. 12, 1919.
1,325,061.
Patented Dec. 16, 1919.
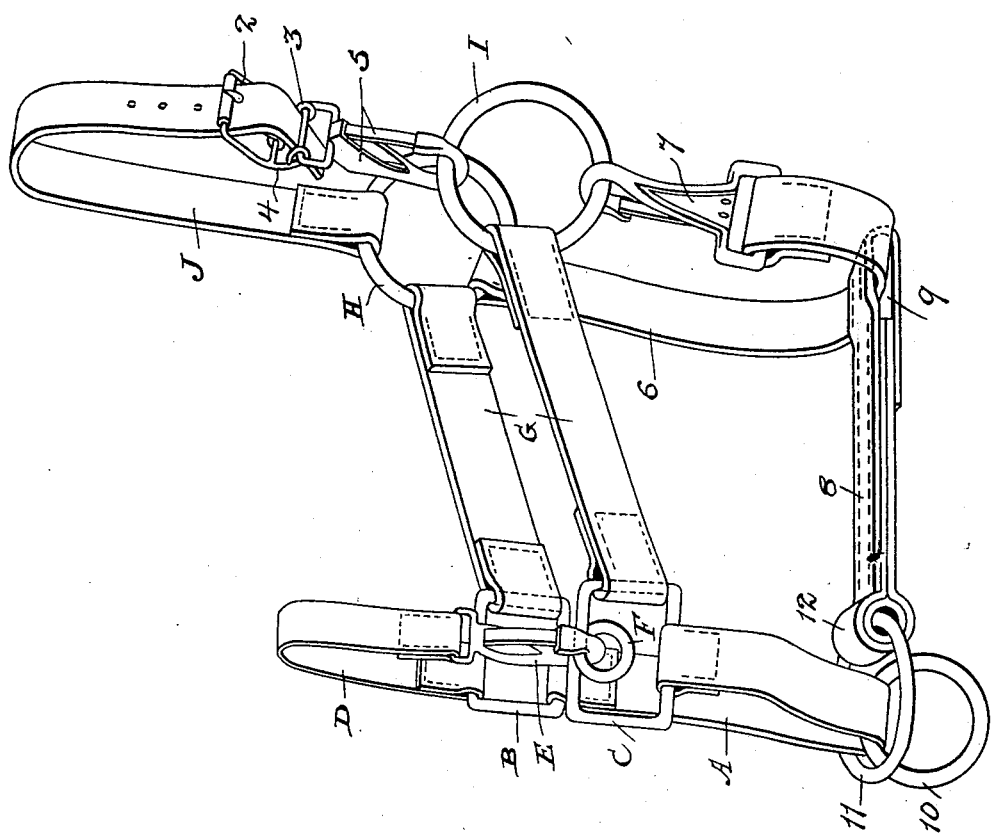
Inventor.

UNITED STATES PATENT OFFICE.

AUSTIN VEAL, OF LANGENBURG, SASKATCHEWAN, CANADA.

HALTER.

1,325,061. Specification of Letters Patent. Patented Dec. 16, 1919.

Application filed April 12, 1919. Serial No. 289,678.

*To all whom it may concern:*

Be it known that I, AUSTIN VEAL, a subject of the King of Great Britain, of the town of Langenburg, Province of Saskatchewan, Dominion of Canada, have invented certain new and useful Improvements in Halters, of which the following is a specification.

My invention relates to improvements in halters, and the object of my invention is to provide a halter that can be readily attached to the animal's head, and removed therefrom, even though the bridle be in place, so that the danger of the animal running away, while removing the bridle to place on the halter, or in removing the halter to place on the bridle, is entirely overcome, and the construction of my halter and the parts that I claim as new will be disclosed in the specification, and set forth in the claims forming part thereof.

The drawing is a perspective view of my halter.

No halters with which I am acquainted can be placed on the animal's head, while the bridle is still worn. Quite often high-spirited animals have gotten away from their attendants while the halter is being placed after the bridle has been removed, and, as above set forth, I provide a halter which will prevent the attendant's losing control of the animal.

A is the chin-strap to the ends of which are secured coupling-elements B and C, preferably in the form of rectangular-shaped metal frames. Permanently coupled to the coupling-element B is one end of the nose-strap D. The other end of this nose-strap is provided with a snap-hook E, which is coupled to an eye F, forming part of the coupling-element C. Permanently coupled to the elements B and C are the cheek-straps G, which are also coupled permanently to the halter-rings H and I. One end of the head-strap J is permanently coupled to the halter-ring H, and the other end of this head-strap is provided with a buckle 2. Pivoted in the eyes 3 of the arms 4 of the buckle 2 is a snap-hook 5, which is coupled to the halter-ring I. The throat-strap 6 is permanently coupled at one end to the halter-ring H, and the other end thereof is provided with a snap-hook 7 which is coupled to the halter-ring I. The throat-tug 8 is provided with a looped end 9, through which passes the throat-strap 6, thus coupling these members together. 10 is a ring through which the chin-strap A passes, and this ring 10 normally depends below the ring 11, through which extends the lower end of the chin-strap A. 12 is a loop forming part of the throat-tug 8 in which the ring 11 is held.

To place the halter on the animal's head if the bridle be worn, the snap-hook 5 is disengaged from the halter-ring I, and the throat-strap 6 is placed underneath the animal's throat, while the head-strap J is placed over the head, and then the snap-hook 5 is coupled to the ring I. The snap-hook E is uncoupled from the coupling-element C, and then the nose-strap D is placed on the animal's nose underneath what might be called the side-straps of the bridle (not shown), while at the same time, the chin-strap A is positioned, and then the snap-hook E is coupled to the eye F.

From what has been set forth, it will be self-evident that this halter may be removed from the animal's head after the bridle is placed in position, and therefore, it is self-evident that I have provided a very safe and efficient device whereby the attendant need not lose control of the animal.

When the animal is not wearing a bridle, the halter can be quickly put on, or taken off, by uncoupling the snap-hook 7 from the halter-ring I without the necessity of having to uncouple the snap-hooks E and 5. These snap-hooks E and 5 are only uncoupled from their associated members, when the halter is to be placed on the animal's head, and removed therefrom, while the bridle is in position.

By means of the buckle 2, the head-strap J can be adjusted to different sized heads.

Of course, the tie-strap (not shown) is coupled to the ring 10.

The relative sizes of the rings 10 and 11 are such that the ring 10 cannot be pulled through the ring 11.

Obviously, changes in construction may be made without departing from the spirit of this invention.

What I claim as new is:

1. A halter comprising a chin-strap to each end of which is permanently secured a coupling element; a nose-strap permanently secured at one end to one of said coupling elements; a snap-hook secured to the free end of said nose-strap and coupled to the other of said coupling-elements carried by said chin-strap; a pair of cheek-straps permanently associated at their forward ends with their associated coupling-elements carried by said chin-strap; a halter-ring permanently associated with the rear end of each of said cheek-straps; a head-strap permanently associated with one of said halter rings; a snap-hook adjustably associated with the free end of said head-strap and designed to be coupled to the other of said halter-rings; a throat-strap permanently secured at one end to one of said halter-rings; a snap-hook carried by the free end of said throat-strap and coupled to the other of said halter-rings; a throat-tug coupled to said throat-strap, and means whereby said throat-tug and said chain-strap are associated together.

2. A halter comprising a chin-strap one end of which is permanently secured to a coupling-element; a coupling-element permanently secured to the other end of said chin-strap and provided with an eye integrally formed therewith; a nose-strap permanently secured at one end to one of said coupling elements; a snap-hook secured to the free end of said nose-strap and coupled to the eye of said eye-provided coupling-element; a pair of cheek-straps permanently associated at their forward ends with their associated coupling-elements carried by said chin-strap, a halter-ring permanently associated with the rear end of each of said cheek-straps; a head-strap permanently associated with one of said halter rings; a snap-hook adjustably associated with the free end of said head-strap and designed to be coupled to the other of said halter-rings; a throat-strap permanently secured at one end to one of said halter-rings; a snap-hook carried by the free end of said throat-strap and coupled to the other of said halter-rings; a throat-tug coupled to said throat-strap, and means whereby said throat-tug and said chin-strap are associated together.

AUSTIN VEAL.